United States Patent [15] 3,680,000
Chesler et al. [45] July 25, 1972

[54] LASER ARRANGEMENT INCLUDING A CAVITY DEFINED BY CONVEX AND CONCAVE MIRRORS

[72] Inventors: Ronald Benjamin Chesler, Summit; Dan Maydan, Berkeley Heights, both of N.J.

[73] Assignee: Bell Telephone Laboratories, Incorporated, Murray Hill, N.J.

[22] Filed: March 19, 1971

[21] Appl. No.: 126,133

[52] U.S. Cl. ....................................................331/94.5
[51] Int. Cl. ......................................................H01s 3/08
[58] Field of Search.............331/94.5; 356/106; 350/202

[56] References Cited

UNITED STATES PATENTS

| | | | |
|---|---|---|---|
| 3,434,073 | 3/1969 | Furkner | 331/94.5 |
| 3,487,331 | 12/1969 | Gates | 331/94.5 |
| 3,440,561 | 4/1969 | Pole et al. | 331/94.5 |
| 3,513,402 | 5/1970 | Marrison | 331/94.5 |
| 3,397,362 | 8/1968 | Grayson et al. | 331/94.5 |
| 3,435,363 | 3/1969 | Patel | 331/94.5 |

OTHER PUBLICATIONS

Stickley, Laser Brightness Gain and Mode Control by Compensation for Thermal Distortion, IEEE J. Quant. Elect. Vol. QE2, No. 4, pg. XIVI.

Primary Examiner—William L. Sikes
Attorney—R. J. Guenther and Kenneth B. Hamlin

[57] ABSTRACT

A laser cavity defined by convex and concave mirrors and including a discrete intracavity lens is characterized by a relatively large $TEM_{oo}$ spot radius, a short physical length and good stability.

5 Claims, 4 Drawing Figures

PATENTED JUL 25 1972 3,680,000

BEST AVAILABLE COPY

INVENTORS R. B. CHESLER
D. MAYDAN
BY
Lucian C. Canepa
ATTORNEY

LASER ARRANGEMENT INCLUDING A CAVITY DEFINED BY CONVEX AND CONCAVE MIRRORS

BACKGROUND OF THE INVENTION

Optimal operation of a solid-state laser in the transverse $TEM_{oo}$ mode requires that the optical spot radius ($1/e^2$ intensity) within the active laser element be about one-half the radius of the laser element. If this condition is approximately satisfied, the $TEM_{oo}$ mode will oscillate with the minimum diffraction losses consistent with the suppression of higher-order transverse modes.

Several techniques are known for achieving a suitably large $TEM_{oo}$ mode radius within the active element of a solid-state laser arrangement. One of these involves forming convex mirror surfaces on the respective ends of the element. The successful operation of such an arrangement depends on the existence of thermal focusing within the pumped element. This design has three drawbacks: (1) the arrangement has marginal stability (according to the stability criteria specified in the Kogelnik reference cited hereinbelow), and thermal and mechanical perturbations produce significant fluctuations in the power output thereof; (2) the thermal focusing action is imperfect; and (3) operation of the arrangement is restricted to a fixed input power.

Another known technique involves the use of a nearly concentric cavity that includes spaced-apart planar and concave mirrors. Typically, for a laser element about 10 cm in length, the distance between these mirrors approximates 70 cm. Arrangements of this type using shorter mirror radii and mirror separations are inefficient because of the significant variation of mode radius that then occurs from one end of the laser element to the other. In addition, such shorter arrangements operate near the boundary of instability.

SUMMARY OF THE INVENTION

An object of the present invention is an improved laser arrangement.

More specifically, an object of this invention is a simple solid-state laser that is compact, stable and efficient.

Another object of the present invention is a laser arrangement that is particularly suitable for intracavity modulation and nonlinear conversion applications.

These and other objects of the present invention are realized in a specific illustrative embodiment thereof that comprises a laser arrangement featuring a convex mirror, a lens having a focal length $f$, an active laser element positioned between the convex mirror and the lens and a concave mirror spaced a distance $p$ from the lens to satisfy the relationship $f < p$.

BRIEF DESCRIPTION OF THE DRAWING

A complete understanding of the present invention and of the above and other objects, features and advantages thereof may be gained from a consideration of the following detailed description of an illustrative embodiment thereof presented hereinbelow in connection with the accompanying drawing, in which.

DETAILED DESCRIPTION

Figure 1:
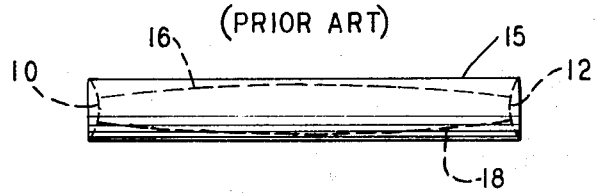
FIGS. 1 and 2 each show a prior art laser arrangement.

One prior art technique for achieving a relatively large $TEM_{oo}$ mode radius within the active element of a solid-state laser arrangement is depicted in simplified form in FIG. 1. As shown, the respective ends 10 and 12 of a solid-state laser element 15 are shaped to form convex mirror surfaces. When conventionally pumped by a suitable means (not shown), the depicted arrangement is effective to establish a relatively large $TEM_{oo}$ spot radius within the element 15. The profile of the $TEM_{oo}$ mode within the element 15 is represented approximately by dashed lines 16 and 18.

As indicated earlier above, the successful operation of a prior art arrangement of the type shown in FIG. 1 depends on the existence of thermal focusing (arising from a temperature gradient) within the pumped element 15. But, as stated before, such a focusing action is imperfect and, as a practical matter, attempts to constrain the focusing action within prescribed limits cause the operation of the arrangement to be limited to a fixed input power. Also, in actual operation, the illustrated arrangement possesses marginal stability. Moreover, thermal and mechanical perturbations affect the performance of the arrangement by producing significant fluctuations in the output power thereof.

Figure 2:
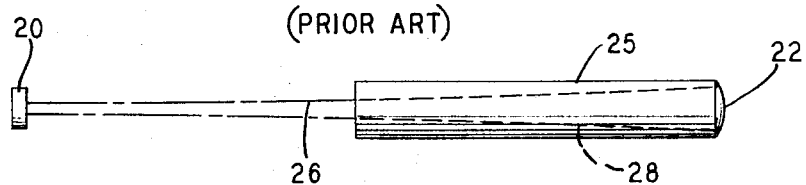

Another prior art laser arrangement, shown in FIG. 2, comprises a nearly concentric cavity encompassed by a planar mirror surface 20 and a concave mirror surface 22. Such an arrangement is effective to define a $TEM_{oo}$ mode (represented by dashed lines 26 and 28) that expands to a relatively large size within laser element 25 near the mirror surface 22. Again, a thermal-focusing action is assumed to be present within the element 25, so that the effective radius of the surface 22 is only slightly greater than the separation between the surfaces 20 and 22.

The primary disadvantage of the FIG. 2 arrangement is its relatively long length. In one typical case, in which the length of the laser element 25 was only about 10 cm, the distance between the mirror surfaces 20 and 22 was required for efficient operation to be approximately 70 cm.

Shorter cavities of the FIG. 2 type can be constructed but, as the mirrors of such a cavity are moved closer together and as the radius of curvature of the concave surface thereof is decreased, the arrangement becomes relatively inefficient. This is so because of the significant variation of mode radius that then occurs within the element 25 from one end to the other. Also, such shorter cavities operate near the boundary of instability.

Figure 3:
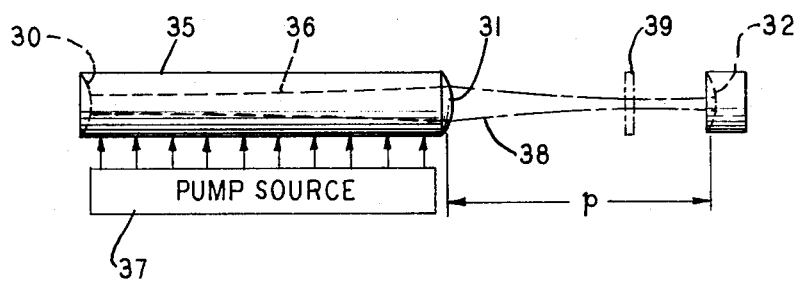
FIG. 3 depicts a specific illustrative laser arrangement made in accordance with the principles of the present invention.

FIG. 3 shows a specific illustrative laser arrangement that embodies the principles of the present invention. The depicted arrangement constitutes a compact structure for achieving a large $TEM_{oo}$ mode radius. The arrangement, which is characterized by good stability, comprises an active laser element 35 (for example, a rod of Nd:YAlG) a conventional pump source 37, a convex mirror surface 30 having a radius of curvature $R_n$, a positive lens 31 having a focal length $f$ and a concave mirror surface 32, having a radius $R_p$, located a distance $p$ from the lens 31. In accordance with the principles of this invention, the inequality $f < p$ must be satisfied.

For illustrative purposes the elements 30 and 31 are shown in FIG. 3 as being formed (for example, ground) on the respective ends of the rod 35. Although such an integral structure is generally advantageous, it is to be understood that physically separate elements can be combined with the rod 35 to achieve an equivalent configuration.

The profile of the $TEM_{oo}$ mode within the laser element 35 of FIG. 3 is represented by dashed lines 36 and 38. As shown in FIG. 3 the beam represented by the lines 36 and 38 includes a focused or small-waist portion between the lens 31 and the mirror surface 32. (The beam so indicated is intended to be representative of the arrangement operating in either a continuous or a pulsed mode.) Because it provides a focused beam, the depicted arrangement is well suited to be combined with a modulator element or a non-linear element (positioned, for example, at the location of a dashed-outline element 39) to form an intracavity modulator or converter unit. By way of example, an arrangement of the type shown in FIG. 3 facilitates acousto-optic cavity dumping and Q-switching, which are described by applicants in "Cavity Dumping and Q-Switching of Nd:YAlG Lasers," Journal Applied Physics, Feb. 1970. In general, the focused beam provided by the FIG. 3 arrangement is advantageous for use in conjunction with electro-optic modulators and nonlinear optical devices such as parametric oscillators and harmonic generators.

There are an infinite number of sets of parameters which define the same mode radius within the laser rod 35 shown in FIG. 3. Shorter, more compact designs can be realized by selecting small values of $f$ and $R_p$. As a practical matter the limit of short cavity designs is determined by problems in fabricating high-quality mirrors having short radii of curvature. Another practical limit to achieving short cavity structures is provided by the increasingly smaller spot radius and therefore higher light intensity that is formed at the mirror surface 32. As the spot radius decreases, the possibility of causing heat damage to the surface 32 increases.

In general, the radius $R_n$ of the convex mirror surface 30 shown in FIG. 3 should be large compared to the length of the laser rod 35 but, preferably, should be small enough to dominate over any thermal focusing that exists in the rod 35.

A practical advantage of the arrangement shown in FIG. 3 is that small adjustments of the mode radius within the laser rod 35 can be easily made, with fixed values of $R_n$, $R_p$, and $f$, by merely varying the distance $p$. The ability to make such adjustments in this way simplifies the design of the depicted arrangement and increases the flexibility of using the arrangement in various applications of practical interest.

One particular illustrative set of values appropriate to achieve efficient and stable $TEM_{oo}$ mode operation in the FIG. 3 arrangement for an Nd:YAlG laser rod 2.5 mm in diameter and 10 cm in optical length is as follows: $R_n = 100$ cm, $f = 10$ cm, $p = 13.5$ cm, and $R_p = 2.5$ cm. For this specific set of values, the overall length of the depicted cavity arrangement was only 19 cm. In actual operation, for a predetermined set of pumping conditions the spot radius at the beam waist (the narrowest cross section) between the elements 31 and 32 of the illustrated arrangement was 64 microns and measurements indicated that the arrangement was then providing 0.6 watts of continuous-wave $TEM_{oo}$ mode output power at 0.14 percent total power efficiency. By contrast, a conventional cavity 35 cm in length and including two 3-meter concave mirrors yielded only 0.45 watts of output power under the same pumping conditions using an active Nd:YAlG laser rod of similar quality with flat and parallel antireflection-coated ends.

Figure 4:
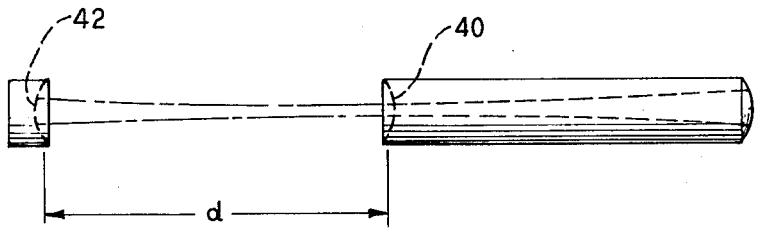
FIG. 4 shows an equivalent representation of the FIG. 3 arrangement.

For purposes of analysis only, it is useful to recognize that the laser arrangement illustrated in FIG. 3 can be redrawn as shown in FIG. 4. The basis for redrawing FIG. 3 is that the mirror surface 32 thereof can be considered to be imaged by the lens 31 into a mirror surface 42 (FIG. 4) which is located a distance $d$ from the mirror surface 40. This transformation is governed by the usual laws of geometrical optics, which determine the radius and position of the mirror surface 42. The surfaces 40 and 42 form a lensless cavity whose properties can be calculated in a straightforward way using known formulas. (See, for example, "Modes in Optical Resonators" by H. Kogelnik, Lasers, Volume I, edited by A. Levine, M. Dekker, Inc., New York, 1966.) The lensless cavity need not be limited to any particular short length, thus allowing an advantageous freedom of design to meet stability and mode size requirements.

It is to be understood that the above-described arrangements are only illustrative of the application of the principles of the present invention. In accordance with these principles, numerous other arrangements may be devised by those skilled in the art without departing from the spirit and scope of the invention.

What is claimed is:

1. In combination,
   a laser cavity having a main longitudinal axis, said cavity being defined by spaced-apart convex and concave mirror surfaces positioned along said axis,
   an active laser element positioned along said axis between said surfaces,
   and a lens having a focal length $f$ positioned along said axis between said element and said concave surface at a distance $p$ from said concave surface to satisfy the inequality $f > p$.

2. A laser arrangement having a main longitudinal axis, said arrangement comprising
   a convex mirror positioned along said axis,
   a lens, having a focal length $f$, positioned along said axis,
   an active laser element positioned along said axis between said mirror and said lens,
   and a concave mirror positioned along said axis and spaced a distance $p$ from said lens to satisfy the relationship $f < p$.

3. An arrangement as in claim 2 wherein said convex mirror and said lens are formed integral with and on the respective ends of said laser element.

4. An arrangement as in claim 3 wherein said laser element is made of Nd:YAlG.

5. An arrangement as in claim 4 further including means for pumping said laser element to cause said arrangement to operate in the $TEM_{oo}$ transverse mode.

* * * * *